(12) United States Patent
Holm Jensen et al.

(10) Patent No.: US 9,671,834 B2
(45) Date of Patent: Jun. 6, 2017

(54) RETRACTABLE SCREEN-AND-KEYBOARD ASSEMBLY FOR TABLES

(71) Applicant: Albiral Display Solutions, S.L., Barcelona (ES)

(72) Inventors: Henrik Bo Aage Holm Jensen, Barcelona (ES); Montserrat Romero Font, Barcelona (ES)

(73) Assignee: Albiral Display Solutions, S.L., Barcelona (ES)

( * ) Notice: Subject to any disclaimer, the term of this patent is extended or adjusted under 35 U.S.C. 154(b) by 0 days.

(21) Appl. No.: 14/761,860

(22) PCT Filed: Jan. 20, 2014

(86) PCT No.: PCT/ES2014/070033
§ 371 (c)(1),
(2) Date: Jul. 17, 2015

(87) PCT Pub. No.: WO2014/111613
PCT Pub. Date: Jul. 24, 2014

(65) Prior Publication Data
US 2015/0370292 A1     Dec. 24, 2015

(30) Foreign Application Priority Data

Jan. 18, 2013  (ES) .............................. 201330042 U (51) Int. Cl.
*G06F 1/16* (2006.01)
*G06F 1/18* (2006.01)
(Continued)

(52) U.S. Cl.
CPC .............. *G06F 1/182* (2013.01); *A47B 23/04* (2013.01); *G06F 1/1601* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,212,628 A * | 5/1993 | Bradbury | G06F 1/1628 361/679.09 |
| 5,590,022 A * | 12/1996 | Harvey | G06F 1/1628 206/576 |

(Continued)

FOREIGN PATENT DOCUMENTS

| | | |
|---|---|---|
| DE | 10109137 A1 | 9/2002 |
| EP | 0995369 A1 | 4/2000 |

(Continued)

OTHER PUBLICATIONS

González, A. Figuera, "International Search Report," prepared for PCT/ES2014/070033, as mailed May 6, 2014, four pages.

*Primary Examiner* — Lisa Lea Edmonds
(74) *Attorney, Agent, or Firm* — Winstead PC (57) ABSTRACT

Retractable screen (1) and keyboard (2) assembly for tables, comprising a supporting structure provided with a frame (3) defining a housing (4), and with a supporting frame (5) on the table, the screen (1) being able to rotate from a position in which it is stowed inside the housing (4) and flush with the supporting frame (5) to an elevated use position, a platform (6) arranged in the housing (4) on which the keyboard (2) rests, means for guiding (G) the platform (6) vertically from a lower position which leaves space for the stowed screen (1) and an upper use position, and further comprising a base (7) for the screen (1) which can rotate about a fixed axis (Γ) in relation to said frame (3), the screen (1) being mounted on said base (7), the screen (1) and base (7) assembly being able to rotate about said axis (Γ) from the stowed position to the use position.

11 Claims, 6 Drawing Sheets

(51) Int. Cl.
*A47B 23/04* (2006.01)
*A47B 21/007* (2006.01)

(52) U.S. Cl.
CPC ... *A47B 21/0073* (2013.01); *A47B 2021/0076* (2013.01); *A47B 2023/049* (2013.01); *A47B 2200/0008* (2013.01); *A47B 2200/0073* (2013.01); *A47B 2200/0079* (2013.01)

(56) References Cited

U.S. PATENT DOCUMENTS

| | | | | |
|---|---|---|---|---|
| 5,717,567 A * | 2/1998 | Tao | ............... | G06F 1/1628 312/223.3 |
| 5,867,148 A | 2/1999 | Kamimaki et al. | | |
| 5,951,128 A * | 9/1999 | Aidone | ............... | B60R 7/043 108/44 |
| 5,973,917 A * | 10/1999 | White | ............... | B60N 3/001 224/275 |
| 6,128,186 A * | 10/2000 | Feierbach | ............... | G06F 1/1613 312/223.3 |
| 6,134,105 A * | 10/2000 | Lueker | ............... | G06F 1/1628 206/320 |
| 6,426,869 B1 * | 7/2002 | White | ............... | B60N 3/001 108/44 |
| 6,490,154 B2 * | 12/2002 | Thompson | ............... | G06F 1/1632 361/679.09 |
| 6,827,409 B2 * | 12/2004 | Michael | ............... | A47B 21/0073 248/920 |
| 7,593,222 B2 * | 9/2009 | Zbikowski | ............... | A45C 13/02 190/12 A |
| 8,427,826 B2 * | 4/2013 | Sullivan | ............... | G06F 1/1616 248/346.06 |
| 8,540,109 B1 * | 9/2013 | McPeek | ............... | A45C 13/02 190/36 |
| 8,804,327 B2 * | 8/2014 | Al-Khayyat | ............... | G06F 1/1696 361/679.09 |
| 8,976,522 B2 * | 3/2015 | Yen | ............... | G06F 1/1632 312/209 |
| 2004/0090154 A1 * | 5/2004 | Chang | ............... | A47B 21/0073 312/223.3 |
| 2005/0035262 A1 | 2/2005 | Seki et al. | | |
| 2006/0150869 A1 * | 7/2006 | Cvek | ............... | A47B 21/0073 108/25 |
| 2006/0161993 A1 * | 7/2006 | Cvek | ............... | A47B 21/0073 726/34 |
| 2006/0220505 A1 | 10/2006 | Nakamura et al. | | |
| 2007/0046635 A1 | 3/2007 | Nishiyama et al. | | |
| 2007/0170826 A1 * | 7/2007 | Tsao | ............... | A47B 21/0073 312/223.3 |
| 2009/0102335 A1 * | 4/2009 | Hancock | ............... | A47B 21/0073 312/223.3 |
| 2011/0069445 A1 * | 3/2011 | Haren | ............... | G06F 1/1632 361/679.44 |
| 2011/0235249 A1 * | 9/2011 | Bustle | ............... | A47B 21/0314 361/679.01 |
| 2011/0235250 A1 * | 9/2011 | Burgess | ............... | F16M 11/046 361/679.01 |
| 2012/0260830 A1 * | 10/2012 | Luiten | ............... | A47B 21/0073 108/6 |
| 2013/0068141 A1 * | 3/2013 | Hsiao | ............... | A47B 21/0073 108/2 |
| 2013/0120922 A1 * | 5/2013 | Castle | ............... | G06F 1/1601 361/679.08 |

FOREIGN PATENT DOCUMENTS

| | | |
|---|---|---|
| IT | BO20100170 A1 | 9/2011 |
| JP | H04300502 A | 10/1992 |

* cited by examiner

RETRACTABLE SCREEN-AND-KEYBOARD ASSEMBLY FOR TABLES

The present invention relates to a retractable screen and keyboard assembly for tables, occupying a minimum space and providing different configurations for use.

BACKGROUND OF THE INVENTION

Retractable screen and keyboard assemblies for tables comprising a supporting structure provided with a frame defining a housing and with a supporting frame on the table, the screen being able to rotate from a position in which it is stowed inside the housing and flush with the supporting frame to an elevated use position, a platform arranged in the housing on which the keyboard rests, means for guiding the platform vertically from a lower position which leaves space for the stowed screen and an upper use position, are well known.

An example of such system is disclosed in document DE10109137, in which all the above mentioned features are described.

Nevertheless, the mechanism disclosed in this document is difficult to be practically implemented due to the connections involved in the disclosed kinematics.

DESCRIPTION OF THE INVENTION

In order to overcome the drawbacks of the state of the art, the present invention provides a retractable screen and keyboard assembly for tables, comprising:
  a supporting structure provided with a frame defining a housing, and with a supporting frame on the table;
  the screen being able to rotate from a position in which it is stowed inside the housing and flush with the supporting frame to an elevated use position,
  a platform arranged in the housing on which the keyboard rests,
  means for guiding the platform vertically from a lower position which leaves space for the stowed screen and an upper use position,
characterized in that it comprises a base for the screen which can rotate about a fixed axis in relation to said frame, the screen being mounted on said base, the screen and base assembly being able to rotate about said axis from the stowed position to the use position.

The rotating base about a fixed axis allows to:
  accommodate therein an actuating motor;
  be connected by means of braces or connecting rods, with connecting rods for raising the platform, as shown below;
  serve as base for rotation about an axis perpendicular to the axis of rotation of the base;
  be able to adjust its geometry so that in both use position and folded position, there are no spaces or gaps being poorly attractive, or through which dirt may fall are present;

It should be remarked that in the document mentioned in the background section, the screen does not rotate about a fixed axis, but about a vertically movable axis. No screen base is mentioned either in said prior-art document.

Said base, when the platform is raised, will be located horizontally adjacent to the platform.

According to a particularly advantageous feature of the invention, the assembly comprises an actuating mechanism provided with at least four cams for pushing the platform, two on each side and below the platform which can rotate in relation to the corresponding axes in relation to the frame;
  two first braces of connection between the base and the two closest cams, the base, each of the braces and the respective cam, conforming corresponding first articulated quadrilaterals so that the rotation of the base causes the rotation of the two closest cams;
  two second braces of connection between the two closest cams and the two furthest cams, conforming each of the two closest cams, the corresponding far cam and the corresponding brace a parallelogram quadrilateral so that the two cams have the same motion and simultaneously push and with a vertical movement the platform;
  the mechanism being able thereby to be actuated by a single motor.

According to another advantageous feature of the invention, which can be combined with the previous one, in use position, the platform, the side of the base between the screen and the platform and the screen are successively adjacent surfaces and in stowed position the screen, the rear side of the base and the frame are flush and are adjacent surfaces. In this way, the assembly presents flat surfaces which give continuity to the table where the assembly is stowed, so that it represents a remarkable aesthetic and additionally a comfort of use.

Also grooves and gaps through which dirt can be slipped are minimized.

Still more advantageously, the base presents:
  a first side adjacently arranged to the lower surface of the screen;
  a second side perpendicularly arranged to said first side, being said second side flush to the screen and the frame when the screen is in its stowed position;
  a third side forming an obtuse angle with the first side so that the lower edge of said third side is adjacently arranged to the rear edge of the platform when the screen and the platform are in use position.

This cross-section of the base allows it in both positions to present the continuity between the above mentioned surfaces.

According to further optional features of the invention, which can be considered individually or combined if technically compatible:
  the motor is arranged in the base, matching the motor shaft with the fixed axis, so that it is unnecessary to foresee additional space to that effect.
  the screen can rotate in relation to the base about an axis perpendicular to the fixed axis. In this way, it is possible to orient the screen, and not only to bend it.
  the assembly comprises a second motor for actuating the turn of the screen in relation to the base.
  the assembly comprises a first control board for the image on the screen image and a second control board for the motion of the assembly.
  the assembly comprises an angular position encoder according to the fixed axis able to determine the angular velocity of the screen, and to detect, for example, possible jamming, which may occur by having inadvertently put an object or the hand of a user. Thus, it is possible to control the motor stop in view of the encoder reading.

Finally, the assembly comprises an angular position encoder according to the axis of rotation of the screen in relation to the base, which allows to also control the second motor in view of the presence of obstacles.

BRIEF DESCRIPTION OF THE DRAWINGS

For a better understanding of all that it has been outlined some drawings in which, schematically and solely by way of non-limiting example a practical case of embodiment is represented, are attached.

DESCRIPTION OF A PREFERRED EMBODIMENT

Figure 1:
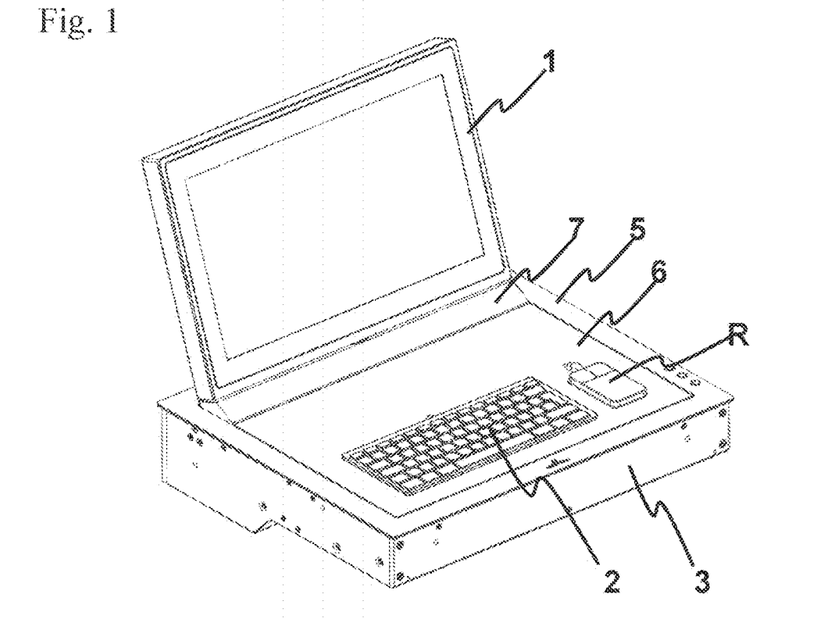
FIG. 1 is a perspective view of the invention in a position for use, wherein the keyboard is flush with the frame, that is, substantially flush with the table surface.
Figure 4:
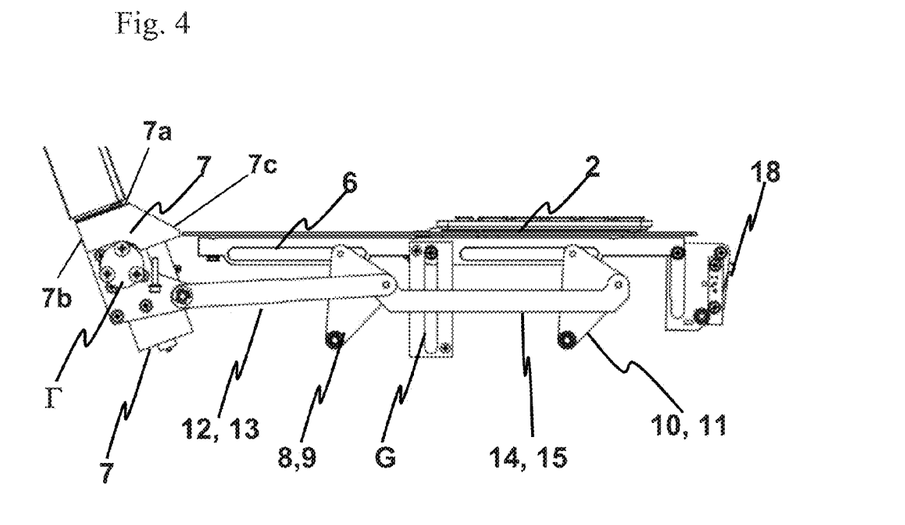
FIG. 4 is a side elevation, with the frame removed, wherein the mechanism with braces and cams are shown. Only braces and cams from one side are shown because the others are arranged in parallel.

As shown in FIGS. 1 and 4, the present invention relates in general to a retractable screen 1 and keyboard 2 assembly for tables, comprising:
- a supporting structure provided with a frame 3 defining a housing 4, and with a supporting frame 5 on the table;
- the screen 1 being able to rotate from a position in which it is stowed inside the housing 4 and flush with the supporting frame 5 to an elevated use position,
- a platform 6 arranged in the housing 4 on which the keyboard 2 rests,
- a guiding element G for guiding the platform 6 vertically from a lower position which leaves space for the stowed screen 1 and an upper use position.

Since these features are known, the present invention is characterized in that it comprises a base 7 for the screen 1 which can rotate about a fixed axis Γ in relation to said frame 3, the screen 1 being mounted on said base 7, the screen 1 and base 7 assembly being able to rotate about said axis Γ from the stowed position to the use position.

Figure 8:
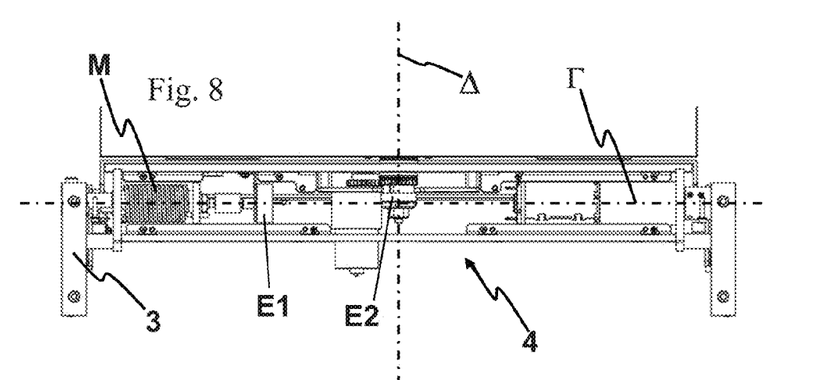
FIGS. 8 and 9 show, on a side elevation and perspective respectively, the parts of the mechanism which are accommodated in the rotating base of the screen.
Figure 9:
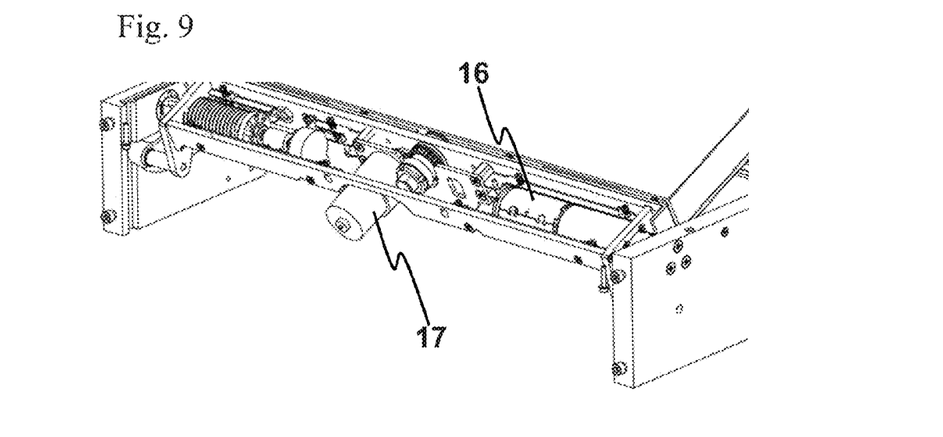

As shown in FIG. 4, the assembly comprises an actuating mechanism provided with:
- at least four cams 8, 9, 10, 11 for pushing the platform 6, two on each side and below the platform 6 which can rotate in relation to the corresponding axes in relation to the frame 3;
- two first braces 12, 13 of connection between the base 7 and the two closest cams 8, 9, the base 7, each of the braces 12, 13 and the respective cam 8, 9, conforming corresponding first articulated quadrilaterals so that the rotation of the base 7 causes the rotation of the two closest cams 8, 9;
- two second braces 14, 15 of connection between the two closest cams 12, 13 and the two furthest cams 10 and 11, conforming each of the two closest cams 8, 9, the corresponding far cam 10, 11 and the corresponding brace 14, 15 a parallelogram quadrilateral so that the two cams 8, 9, 10, 11 have the same motion and simultaneously push and with a vertical movement the platform 6;
- the mechanism being able thereby to be actuated by a single motor 16, whose arrangement is shown in FIGS. 8 and 9.

Figure 2:
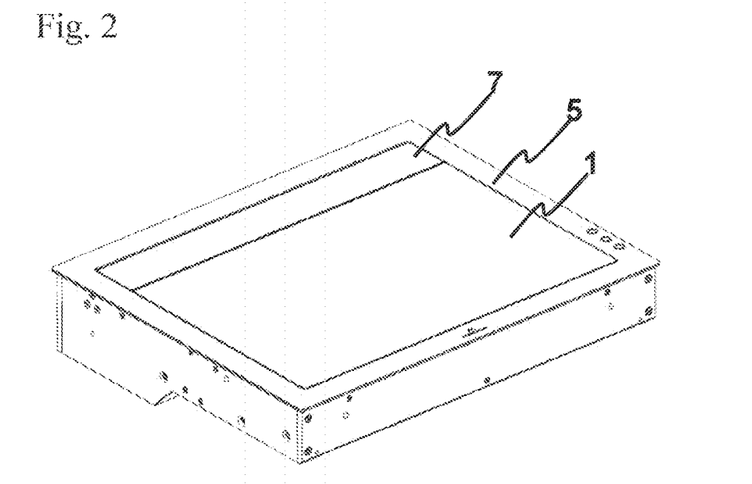
FIG. 2 is a perspective view, wherein the screen is stowed and oriented downwards.
Figure 3:
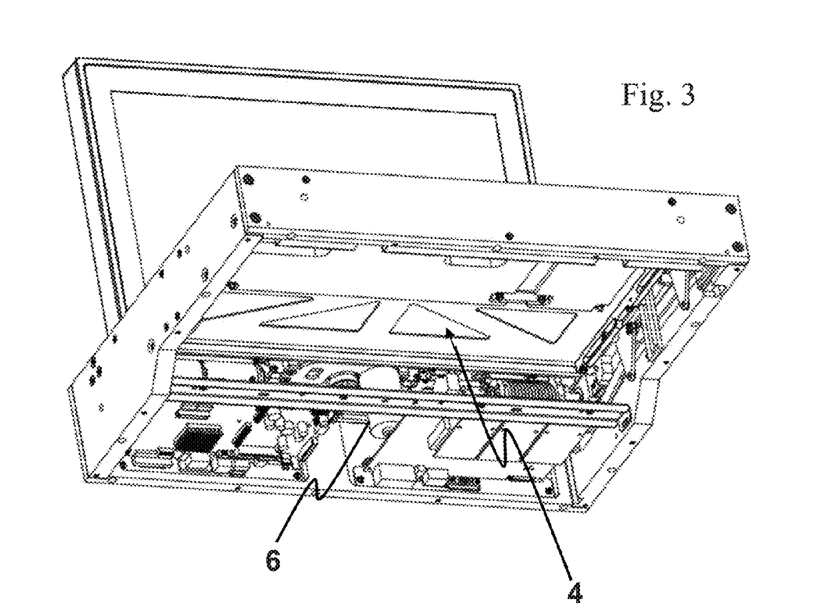
FIG. 3 is a bottom perspective, wherein elements of the actuating mechanism disposed in the housing defined by the frame are shown.

As shown in FIG. 1, in the use position, the platform 6, the side of the base 7 between the screen 1 and the platform 6 and the screen 1 are successively adjacent surfaces; in stowed position the screen 1, the rear side of the base 7 and the frame 5 are flush and are adjacent surfaces, as shown in FIG. 2.

Figure 5:
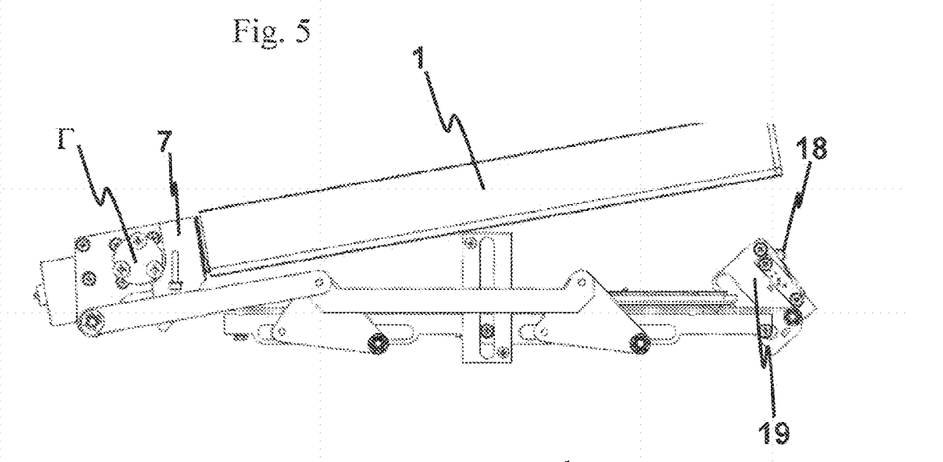
FIGS. 5 and 6 are similar to FIG. 4, but in different positions.
Figure 6:
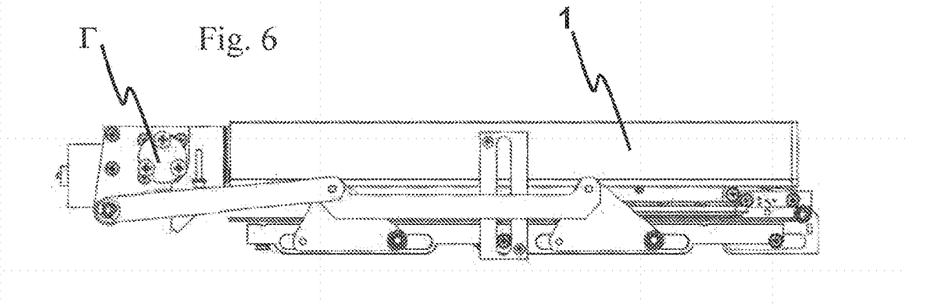
Figure 7:
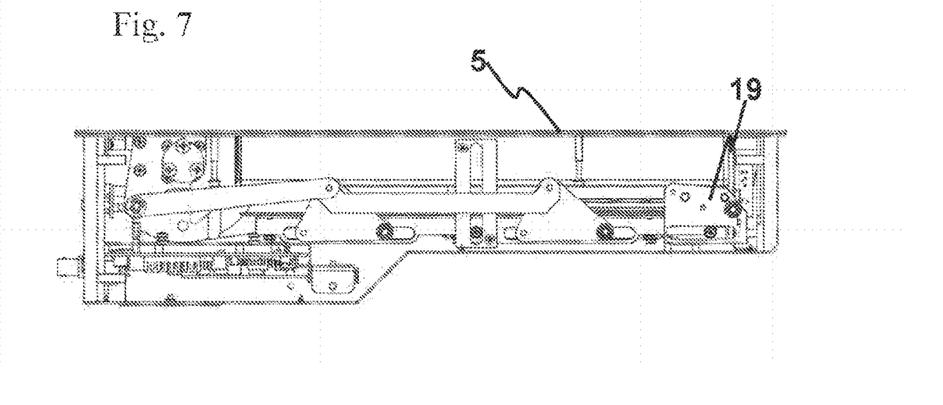
FIG. 7 is similar to FIG. 6, but the outline of the frame and additional parts of the mechanism have been added.

As shown, for example, in FIGS. 4 to 6 in side view, the base 7 presents:
- a first side 7a adjacently arranged to the lower surface of the screen 1;
- a second side 7b perpendicularly arranged to said first side 7a, being said second side 7b flush to the screen 1 and the frame 5 when the screen 1 is in its stowed position;
- a third side 7c forming an obtuse angle with the first side 7a so that the lower edge of said third side 7c is adjacently arranged to the rear edge of the platform 6 when the screen 1 and the platform 6 are in use position.

As shown in FIGS. 8 and 9, the actuating motor 16 is arranged in the base 7, matching the motor shaft with the fixed axis Γ. FIG. 8 also shows angular position encoders E1 and E2 coaxially coupled to, respectively, the fixed axis Γ and the axis of rotation Δ.

Figure 10:
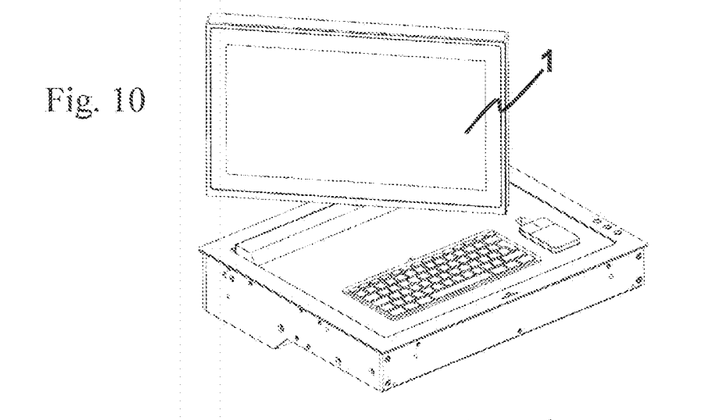
FIG. 10 shows a position of the screen is which the screen is elevated and rotated in relation to the second actuating axis.
Figure 11:
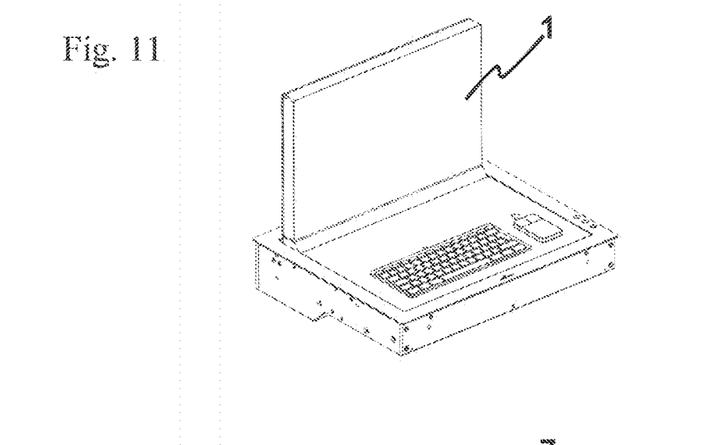
FIG. 11 shows a position prior to the turn which will lead to the position shown in FIG. 12, wherein the screen is stowed inside the housing and flush with the frame/table, although facing up so that images can be viewed.
Figure 12:
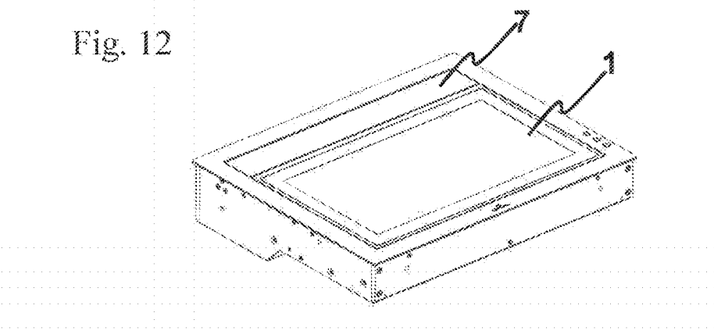

It is also foreseen that the screen 1 can rotate in relation to the base 7 about axis Δ perpendicular to fixed axis Γ, preferably by means of a second motor 17 for actuating the turn of the screen 1 in relation to the base 7, as shown in FIGS. 8 and 9. In this way, as shown in FIG. 10, the base can be oriented so that it can be seen by other people different from the person in front of the keyboard.

It is also foreseen that if, when closing the screen any object is found in the sideways, this would rotate about axis Δ and the turn position control would detect the turn and would stop the closure of the screen.

Another possibility of this feature is that the screen can be taken back to its stowed position, but with the screen facing up, so that it can be employed for viewing images, leaving the work surface totally flat.

As shown in FIGS. 4 to 7, it is also possible to foresee pivoting elements 19 over a fixed axis in the frame provided with supports 18 of screen 1 and arranged at proximity of the front edge of the frame 3 and a rotation mechanism of said pivoting elements 19, so that:
- in stowed screen 1 position the supports 18 are arranged between the platform 6 and the screen 1;
- during the elevation movement of the platform 6 and rise of the screen 1, the mechanism causes the turn of the pivoting elements 19, so that the supports 18 do not interfere with the path of the platform 6;
- being hidden from view after reaching the use position.

Figure 13:
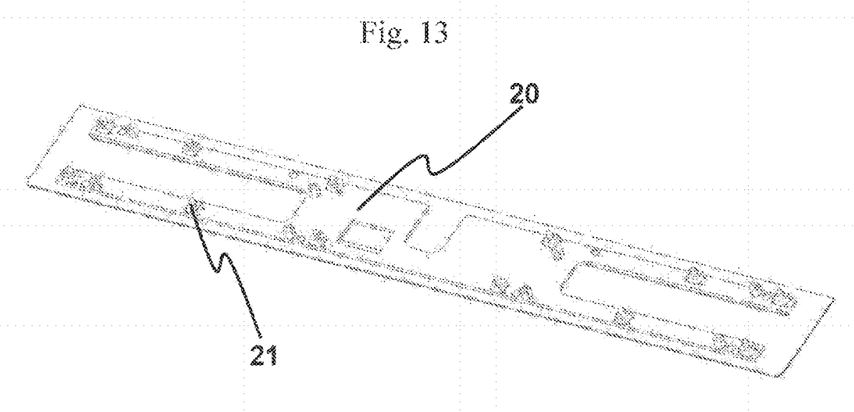
FIG. 13 shows a perspective view of one of the covers of the base, which internally has switches arranged on a plate attached to the cover, which are activated by deforming the latter.

Finally, and as shown in FIG. 13, the second side perpendicularly arranged to said first side is a cover 20 provided in its inner part with sensor switches 21, so that it allows to detect the presence of objects between the base and the frame.

The invention claimed is:

1. A retractable screen and keyboard assembly for tables, comprising:
   a supporting structure provided with a frame defining a housing, and with a supporting frame able to be fitted on a table;
   a screen, the screen being able to rotate between a stowed position, in which it is stowed inside the housing and flush with the supporting frame, and an elevated use position;
   a platform arranged in the housing;
   a keyboard disposed on the platform;
   a guiding element for guiding the platform vertically between a lower position providing a space for stowing the screen and an upper use position; and
   a base for the screen, the base being rotatably coupled to the frame about a fixed axis of rotation;
   wherein the screen is mounted on said base, so that screen and the base can be jointly rotated about said fixed axis of rotation between the stowed position and the use position; and
   wherein the screen is rotatably coupled to the base about a second axis perpendicular to the fixed axis, so that the screen can rotate with respect to the base about said second axis.

2. The assembly according to claim 1, wherein
   in the use position, the platform, a side of the base between the screen and the platform, and the screen are successively adjacent surfaces; and wherein
   in stowed position, the screen, the rear side of the base, and the frame are flush and adjacent surfaces.

3. The assembly according to claim 1, further comprising a second motor for actuating the turn of the screen in relation to the base.

4. The assembly according to claim 1, further comprising a first control board to control the image on the screen and a second control board to control the motion of the assembly.

5. The assembly according to claim 1, further comprising an angular position encoder coaxially coupled to the fixed axis, the angular position encoder being able to determine the angular velocity of the screen.

6. The assembly according to claim 1, further comprising an angular position encoder coaxially coupled to the axis of rotation of the screen in relation to the base.

7. A retractable screen and keyboard assembly for tables, comprising:
   a supporting structure provided with a frame defining a housing, and with a supporting frame able to be fitted on a table;
   a screen, the screen being able to rotate between a stowed position, in which it is stowed inside the housing and flush with the supporting frame, and an elevated use position;
   a platform arranged in the housing;
   a keyboard disposed on the platform;
   a guiding element for guiding the platform vertically between a lower position providing a space for stowing the screen and an upper use position; and
   a base for the screen, the base being rotatably coupled to the frame about a fixed axis of rotation;
   wherein the screen is mounted on said base, so that the screen and the base can be jointly rotated about said fixed axis of rotation between the stowed position and the use position,
   wherein the assembly further comprises an actuating mechanism comprising:
   at least four cams for pushing the platform, two of said at least four cams being provided on each side of and below the platform, able to rotate with respect to the frame about corresponding axes;
   two first braces of connection between the base and the two closest cams, wherein the base, each of the braces and the respective cam conform corresponding first articulated quadrilaterals, so that the rotation of the base causes the rotation of the two closest cams; and
   two second braces of connection between the two closest cams and the two furthest cams, wherein each of the two closest cams, the corresponding far cam and the corresponding brace conform a parallelogram quadrilateral, so that the two cams on each side of the platform have the same motion and simultaneously push the platform along a vertical movement direction, so that the mechanism can thereby be actuated by a single motor.

8. The assembly according to claim 7, wherein said motor is arranged in the base, and wherein a shaft of the motor is coaxial with the fixed axis. the mechanism can thereby be actuated by a single motor.

9. A retractable screen and keyboard assembly for tables, comprising:
   a supporting structure provided with a frame defining a housing, and with a supporting frame able to be fitted on a table;
   a screen, the screen being able to rotate between a stowed position, in which it is stowed inside the housing and flush with the supporting frame, and an elevated use position;
   a platform arranged in the housing;
   a keybord disposed on the platform;
   a guiding element for guiding the platform vertically between a lower position providing a space for stowing the screen and an upper use position; and
   a base for the screen, the base being rotatably coupled to the frame about a fixed axis of rotation;
   wherein the screen is mounted on said base, so that the screen and the base can be jointly rotated about said fixed axis of rotation between the stowed position and the use position, wherein the base comprises:
   a first side adjacently arranged to the lower surface of the screen;
   a second side perpendicularly arranged to said first side, being said second side flush to the screen and the frame when the screen is in its stowed position; and
   a third side forming an obtuse angle with the first side, so that the lower edge of said third side is adjacently arranged to the rear edge of the platform when the screen and the platform are in use position.

10. The assembly according to claim 9, wherein the second side is a cover provided in its inner part with sensor switches adapted to detect the presence of objects between the base and the frame.

11. A retractable screen and keyboard assembly for tables, comprising:
   a supporting structure provided with a frame defining a housing, and with a supporting frame able to be fitted on a table;
   a screen, the screen being able to rotate between a stowed position, in which it is stowed inside the housing and flush with the supporting frame, and an elevated use position;
   a platform arranged in the housing;

a keyboard disposed on the platform;
a guiding element for guiding the platform vertically between a lower position providing a space for stowing the screen and an upper use position; and
a base for the screen, the base being rotatably coupled to the frame about a fixed axis of rotation;
wherein the screen is mounted on said base, so that the screen and the base can be jointly rotated about said fixed axis of rotation between the stowed position and the use position,
wherein the assembly further comprises:
pivoting elements arranged proximate to the front edge of the frame and adapted to pivot with respect to the frame about a third fixed axis; and
a rotation mechanism coupled to said pivoting elements;
wherein each of said pivoting elements comprises a support element to support the screen; and
wherein the rotation mechanism is adapted to actuate on the pivoting elements so that:
the support elements are arranged between the platform and the screen when the screen is in the stowed position;
the pivoting elements are turned away from the platform while the platform is being lifted and the screen is being rotated, so that the support elements do not interfere with the path of the platform; and
the support elements are hidden from view in the housing when the screen has reached the use position.

* * * * *